US012030317B2

(12) United States Patent
Hayashi et al.

(10) Patent No.: US 12,030,317 B2
(45) Date of Patent: Jul. 9, 2024

(54) PRINTING APPARATUS AND CLEANING ASSEMBLY OF PRINTING APPARATUS

(71) Applicant: BROTHER KOGYO KABUSHIKI KAISHA, Nagoya (JP)

(72) Inventors: Kakeru Hayashi, Nagoya (JP); Noriyuki Kawamata, Nagoya (JP)

(73) Assignee: BROTHER KOGYO KABUSHIKI KAISHA, Nagoya (JP)

(*) Notice: Subject to any disclaimer, the term of this patent is extended or adjusted under 35 U.S.C. 154(b) by 53 days.

(21) Appl. No.: 17/705,520

(22) Filed: Mar. 28, 2022

(65) Prior Publication Data

US 2022/0314626 A1 Oct. 6, 2022

(30) Foreign Application Priority Data

Mar. 31, 2021 (JP) ................................ 2021-061996

(51) Int. Cl.
*B41J 2/165* (2006.01)

(52) U.S. Cl.
CPC ....... *B41J 2/16552* (2013.01); *B41J 2/16535* (2013.01)

(58) Field of Classification Search
CPC ................ B41J 2/16552; B41J 2/16535; B41J 2/16508; B41J 2/16538; B41J 2002/16558
See application file for complete search history.

(56) References Cited

U.S. PATENT DOCUMENTS

| | | | | |
|---|---|---|---|---|
| 7,703,412 B2 * | 4/2010 | Iwata | B41J 2/16552 118/694 |
| 2002/0010115 A1 * | 1/2002 | Yano | C11D 3/2003 134/42 |
| 2011/0216127 A1 | 9/2011 | Karppinen et al. | |
| 2017/0157935 A1 | 6/2017 | Ohnishi | |
| 2018/0154639 A1 * | 6/2018 | Furukawa | B41J 2/16517 |

FOREIGN PATENT DOCUMENTS

| | | |
|---|---|---|
| JP | 2018083342 A | 5/2018 |
| WO | 2016002896 A1 | 1/2016 |

OTHER PUBLICATIONS

Office Action issued in related Japanese Patent Application No. 2021-061996, dated Jan. 9, 2024. (2 pages.).

* cited by examiner

*Primary Examiner* — Sharon Polk
(74) *Attorney, Agent, or Firm* — K&L Gates LLP

(57) ABSTRACT

A printing apparatus includes an inkjet head having a nozzle surface on which a nozzle for ejecting ink is formed, a cleaning liquid tank configured to store a cleaning liquid, a cleaning member provided inside the cleaning liquid tank and configured to wipe the nozzle surface, a holding member extending from an outside of the cleaning liquid tank into the cleaning liquid tank and configured to hold the cleaning member, a drive device configured to drive the holding member, and a liquid leakage suppression member provided to at least one of the cleaning liquid tank and the holding member and configured to suppress the cleaning liquid from leaking from the cleaning liquid tank.

17 Claims, 11 Drawing Sheets

PRINTING APPARATUS AND CLEANING ASSEMBLY OF PRINTING APPARATUS

CROSS-REFERENCE TO RELATED APPLICATION

This application is based upon and claims the benefit of priority from prior Japanese patent application No. 2021-061996, filed on Mar. 31, 2021, the entire contents of which are incorporated herein by reference.

TECHNICAL FIELD

The present disclosure relates to a printing apparatus and a cleaning assembly of the printing apparatus.

BACKGROUND

An inkjet printer includes an ink head, a wiper, a cleaning liquid tank, and a wiper moving mechanism. The wiper moving mechanism includes a shaft and a drive device. The wiper is configured to come into contact with a nozzle surface of the ink head and to wipe the nozzle surface. The shaft is configured to grip the wiper and the drive device is configured to rotate the shaft. The wiper is configured to move between a cleaning position where the nozzle surface is wiped and a washing position where the wiper is immersed in a cleaning liquid stored in the cleaning liquid tank by rotation of the shaft.

In the inkjet printer, it is considered that the shaft is inserted from an outside to an inside of the cleaning liquid tank. Since the wiper is rotated or moved by rotation or movement of the shaft, the wiper is moved between the cleaning position and the washing position. However, when the cleaning liquid comes into contact with the shaft, the cleaning liquid may leak to the outside of the cleaning liquid tank via the shaft.

SUMMARY

An object of the present disclosure is to provide a printing apparatus and a cleaning assembly of the printing apparatus that enable to reduce a possibility that a cleaning liquid of a cleaning member which wipes a nozzle surface leaks to an outside of a cleaning liquid tank.

A first aspect of the present disclosure is a printing apparatus. The printing apparatus includes an inkjet head, a cleaning liquid tank, a cleaning member, a holding member, a drive device, and a liquid leakage. The inkjet head has a nozzle surface on which a nozzle for ejecting ink is formed. The cleaning liquid tank is configured to store a cleaning liquid. The cleaning member is provided inside the cleaning liquid tank and is configured to wipe the nozzle surface. The holding member extends from an outside of the cleaning liquid tank into the cleaning liquid tank and is configured to hold the cleaning member. The drive device is configured to drive the holding member. The liquid leakage suppression member is provided to the cleaning liquid tank, the holding member, or both of the cleaning liquid tank and the holding member, and is configured to suppress the cleaning liquid from leaking from the cleaning liquid tank.

Therefore, the printing apparatus can reduce a possibility that the cleaning liquid leaks from the cleaning liquid tank by the liquid leakage suppression member.

A second aspect of the present disclosure is a cleaning assembly of a printing apparatus. The cleaning assembly includes a cleaning liquid tank, a cleaning member, a holding member, a drive device, and a liquid leakage suppression member. The cleaning liquid tank is configured to store a cleaning liquid. The cleaning member is provided inside the cleaning liquid tank and is configured to wipe a nozzle surface of an inkjet head. The holding member extends from an outside of the cleaning liquid tank into the cleaning liquid tank and is configured to hold the cleaning member. The drive device is configured to drive the holding member. The liquid leakage suppression member is provided to the cleaning liquid tank, the holding member, or both of the cleaning liquid tank and the holding member, and is configured to suppress the cleaning liquid from leaking from the cleaning liquid tank.

Therefore, the cleaning assembly of the printing apparatus can reduce the possibility that the cleaning liquid leaks from the cleaning liquid tank by the liquid leakage suppression member.

DETAILED DESCRIPTION

Figure 1:
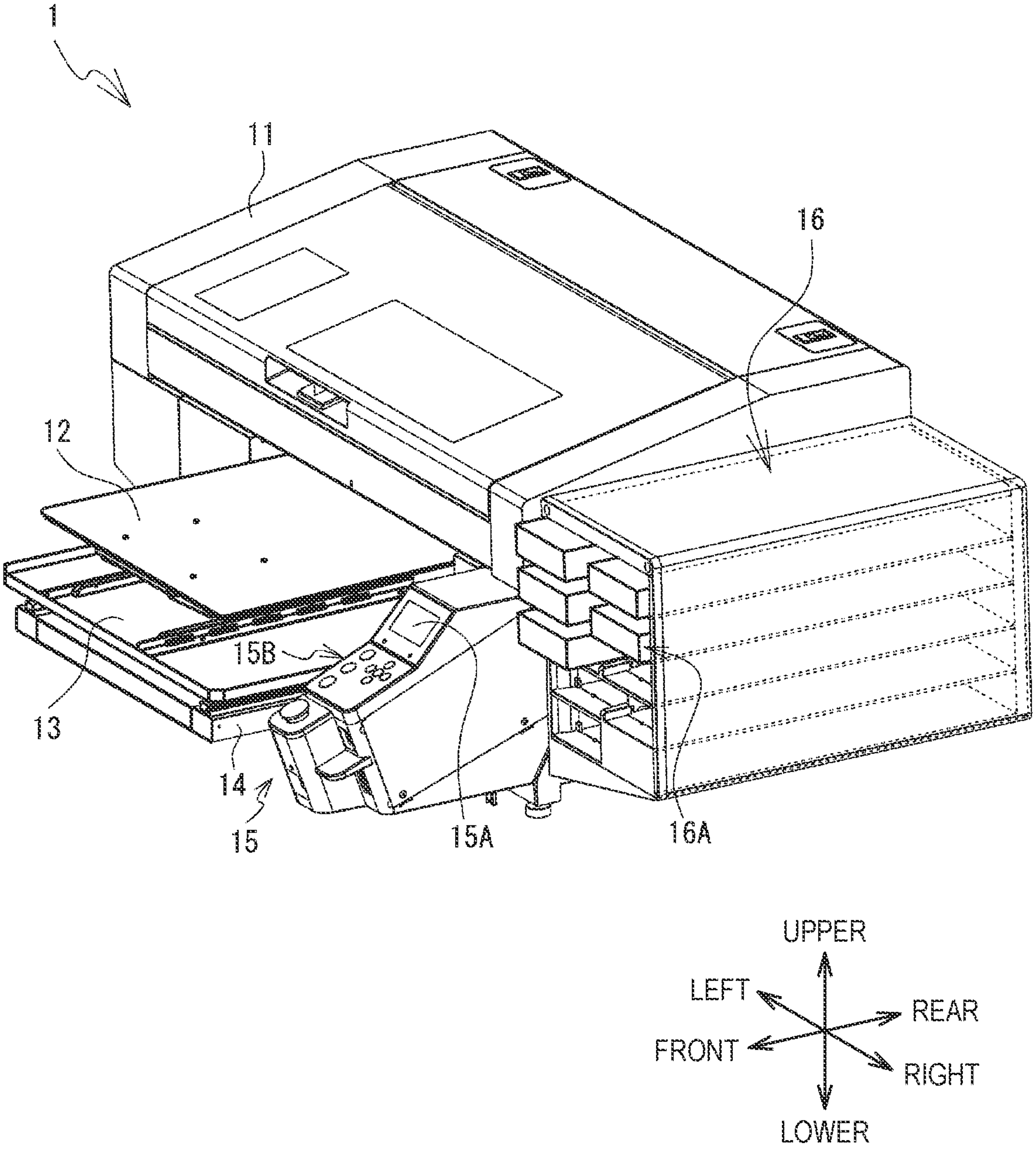
FIG. 1 is a perspective view of a printing apparatus 1.

A printing apparatus 1 according to an embodiment of the present disclosure will be described. The upper, lower, left lower, right upper, right lower and left upper in FIG. 1 are the upper, lower, front, rear, right and left of the printing apparatus 1, respectively. In the present embodiment, a mechanical element shown in the drawings indicates an actual scale.

<Outline of Printing Apparatus 1>

The printing apparatus 1 is an inkjet printer configured to perform printing by ejecting a liquid onto a printing medium such as paper and fabric such as a T-shirt. The printing apparatus 1 is configured to print a color image on the printing medium by ejecting downward the liquid, for example, five types of inks (white, black, yellow, cyan and magenta) having different from each other. In descriptions below, white ink of the five types of inks is referred to as white ink, and inks of four colors of black, cyan, yellow and magenta are collectively referred to as color ink when they are not distinguished from each other.

As shown in FIG. 1, the printing apparatus 1 includes a housing 11, a platen 12, a tray 13, a platen drive mechanism 14, an operation unit 15, a mounting unit 16, and the like. The housing 11 has a box shape and has opening portions on each of a front surface and a rear surface. The operation unit 15 is provided at a position on a right front side of the housing 11. The operation unit 15 includes a display 15A and an operation button 15B. The display 15A is a liquid crystal monitor (LCD) capable of displaying a variety of information. The operation button 15B is operated when a user inputs instructions regarding a variety of operations of the printing device 1.

Figure 10:
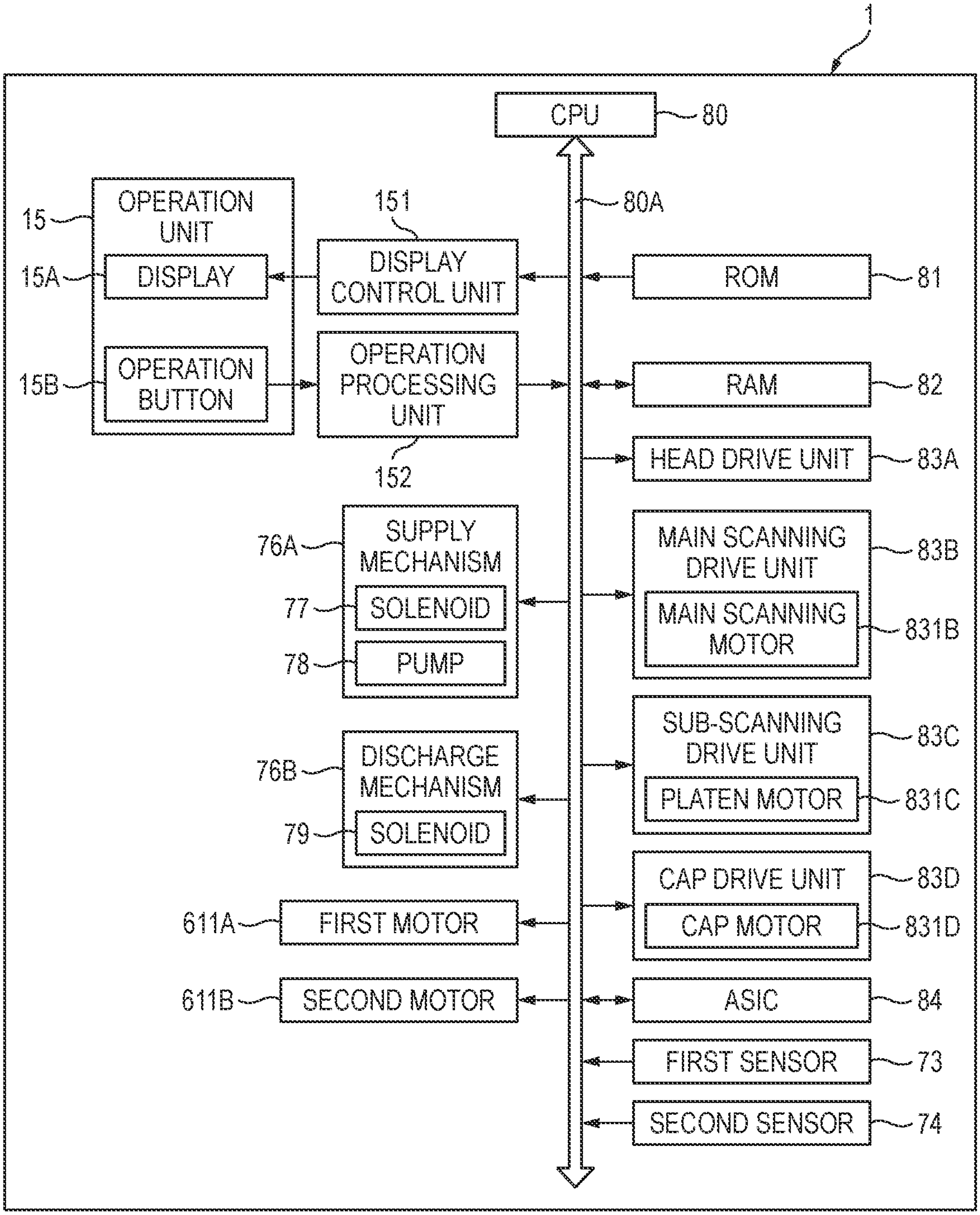
FIG. 10 is a block diagram showing an electrical configuration of the printing apparatus 1.

The platen drive mechanism 14 has therein a sub-scanning drive unit 83C (refer to FIG. 10) configured to move the platen 12 and the tray 13 by drive of a platen motor 831C (refer to FIG. 10). The platen 12 has a rectangular plate shape, as seen from above. The printing medium is placed on an upper surface of the platen 12. The tray 13 configured to protect the printing medium has a rectangular shape, as seen from above, and is provided below the platen 12. The mounting unit 16 is provided on a right side of the housing 11. A cartridge 16A is connected to the mounting unit 16. A liquid accommodated in the cartridge 16A is supplied to a head 3 (refer to FIG. 2).

Figure 2:
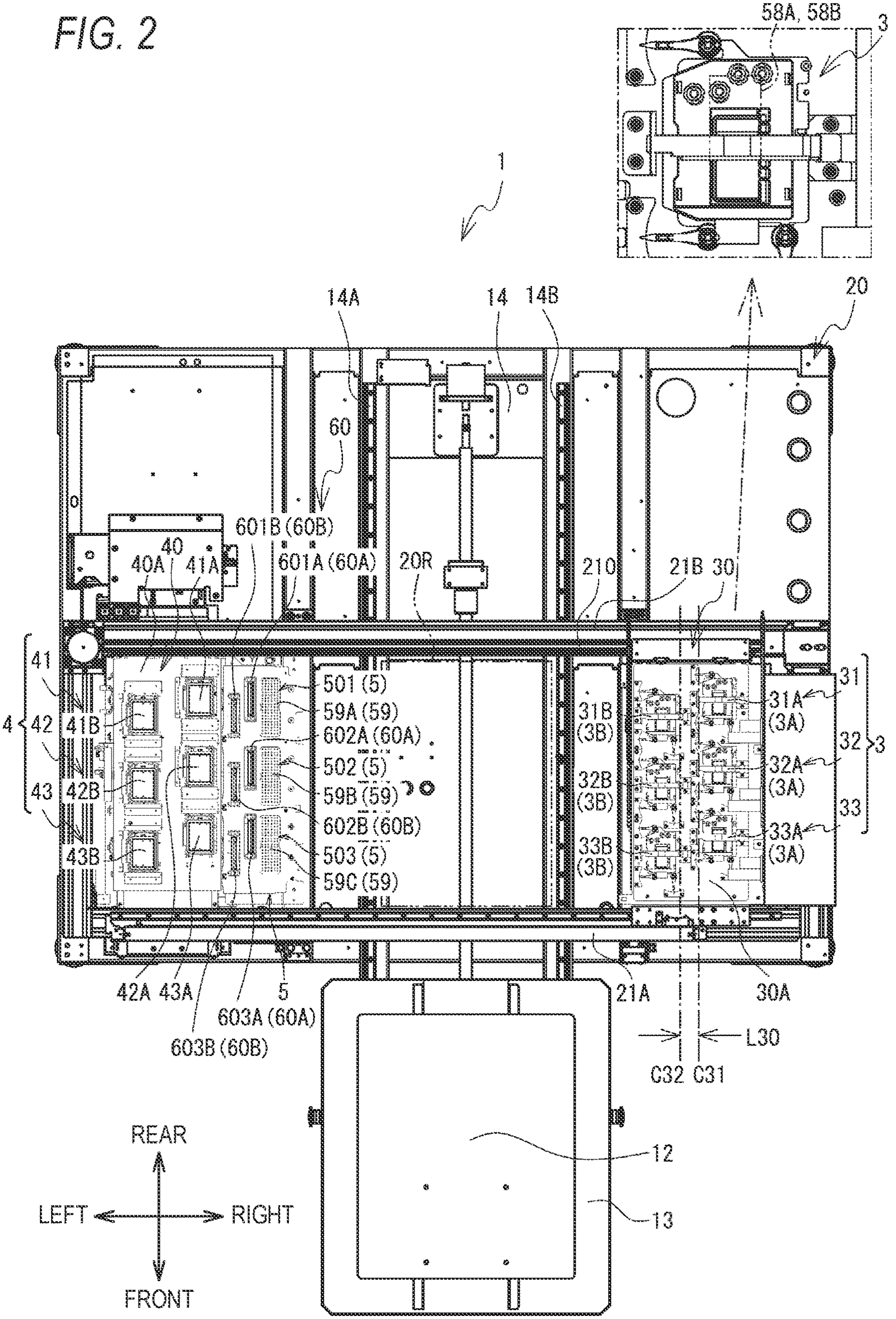
FIG. 2 is a plan view showing an internal structure of the printing apparatus 1.

As shown in FIG. 2, the housing 11 (refer to FIG. 1) is provided therein with a frame body 20, guide shafts 21A and 21B, a carriage 30, a cap mechanism 40, and cleaning assemblies 501, 502, and 503 (which are hereinafter collectively referred to as 'cleaning assembly 5' when they are not distinguished from each other). The frame body 20 is a grid-like structure. The frame body 20 is configured to support the guide shafts 21A and 21B at an upper end. The frame body 20 is configured to support the platen drive mechanism 14 at a center in a right and left direction and on a further lower side than the guide shafts 21A and 21B in an upper and lower direction.

Figure 3:
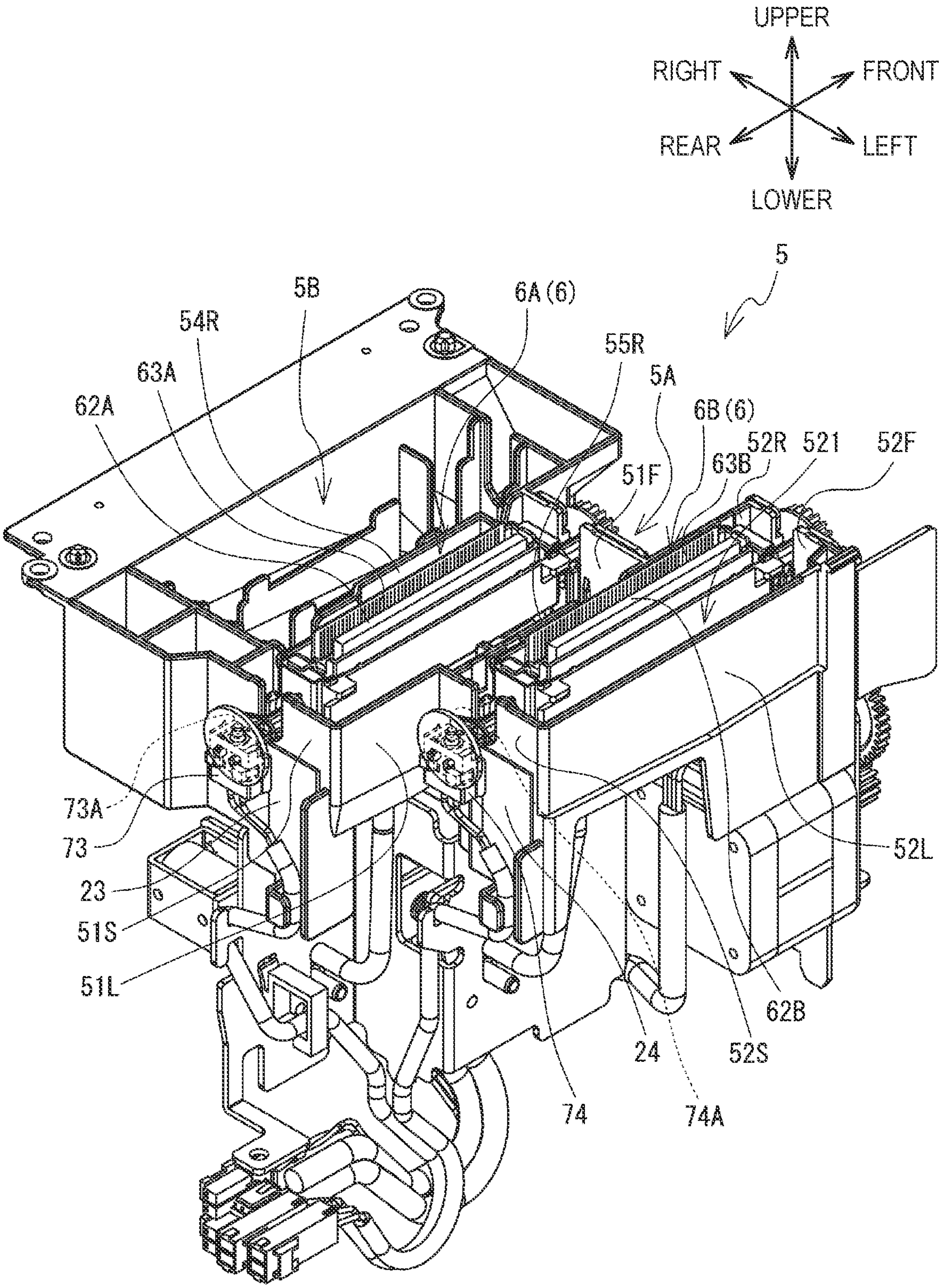
FIG. 3 is a perspective view of a cleaning assembly 5.

The guide shafts 21A and 21B extend in the right and left direction. The guide shafts 21A and 21B are arranged in parallel with each other at an interval in the front and rear direction. The guide shafts 21A and 21B are configured to support the carriage 30 so as to be movable in the right and left direction (hereinafter, also referred to as a main scanning direction). FIGS. 2 and 3 show a state that the carriage 30 is moved to a right end. The carriage 30 includes heads 31, 32 and 33 (refer to FIG. 3; which are hereinafter collectively referred to as 'head 3' when they are not distinguished from each other) configured to eject ink. The head 3 has a piezoelectric element. However, the head 3 may have a heater instead of the piezoelectric element, as a configuration for ejecting ink. A drive belt 210 provided along the guide shaft 21B is configured to move in the main scanning direction by drive of a main scanning motor 831B (refer to FIG. 10) of a main scanning drive unit 83B (refer to FIG. 10). The carriage 30 is connected to the drive belt 210 and is configured to move in the main scanning direction by the drive belt 210. An area sandwiched in the front and rear direction by the guide shafts 21A and 21B corresponds to a movement path of the carriage 30.

The platen drive mechanism 14 has guide rails 14A and 14B on an upper surface. The guide rails 14A and 14B extend in the front and rear direction. The guide rails 14A and 14B are arranged in parallel with each other at an interval in the right and left direction. The guide rails 14A and 14B are configured to support the platen 12 and the tray 13 so as to be movable in the front and rear direction (hereinafter, also referred to as a sub-scanning direction). An area located between the guide rails 14A and 14B in the right and left direction corresponds to a movement path of the platen 12.

The movement path of the platen 12 moving along the guide rails 14A and 14B crosses, in the front and rear direction, the lower of a central portion in the main scanning direction of the movement path of the carriage 30 moving along the guide shafts 21A and 21B. Hereinafter, an area where the movement path of the platen 12 intersects with the movement path of the carriage 30 in the upper and lower direction is referred to as a printing area 20R.

The cap mechanism 40 and the cleaning assembly 5 are provided below the movement path of the carriage 30 in the upper and lower direction and on a left side of the movement path of the platen 12 in the main scanning direction. The cap mechanism 40 and the cleaning assembly 5 are aligned in the main scanning direction, and for example, the cap mechanism 40 is arranged on the left side with respect to the cleaning assembly 5.

The cap mechanism 40 has caps 41, 42, and 43 (which are hereinafter collectively referred to as 'cap 4' when they are not distinguished from each other). The cleaning assembly 5 includes a cleaning liquid tank 5A and a flushing box 5B (refer to FIGS. 3 to 5) for cleaning the head 3 of the carriage 30.

The printing apparatus 1 is configured to reciprocally move the carriage 30 in the main scanning direction while the platen 12 conveys the printing medium in the sub-scanning direction. At this time, the ink is ejected from the head 3 onto the printing medium placed on the platen 12 in the printing area 20R, so that printing is performed on the printing medium.

<Carriage 30>

As shown in FIG. 2, the carriage 30 has a support part 30A configured to support the head 3. A front end of the support part 30A is supported to be movable in the main scanning direction by the guide shaft 21A. A rear end of the support part 30A is supported to be movable in the main scanning direction by the guide shaft 21B. The drive belt 210 is connected to the rear end of the support part 30A.

Figure 11:
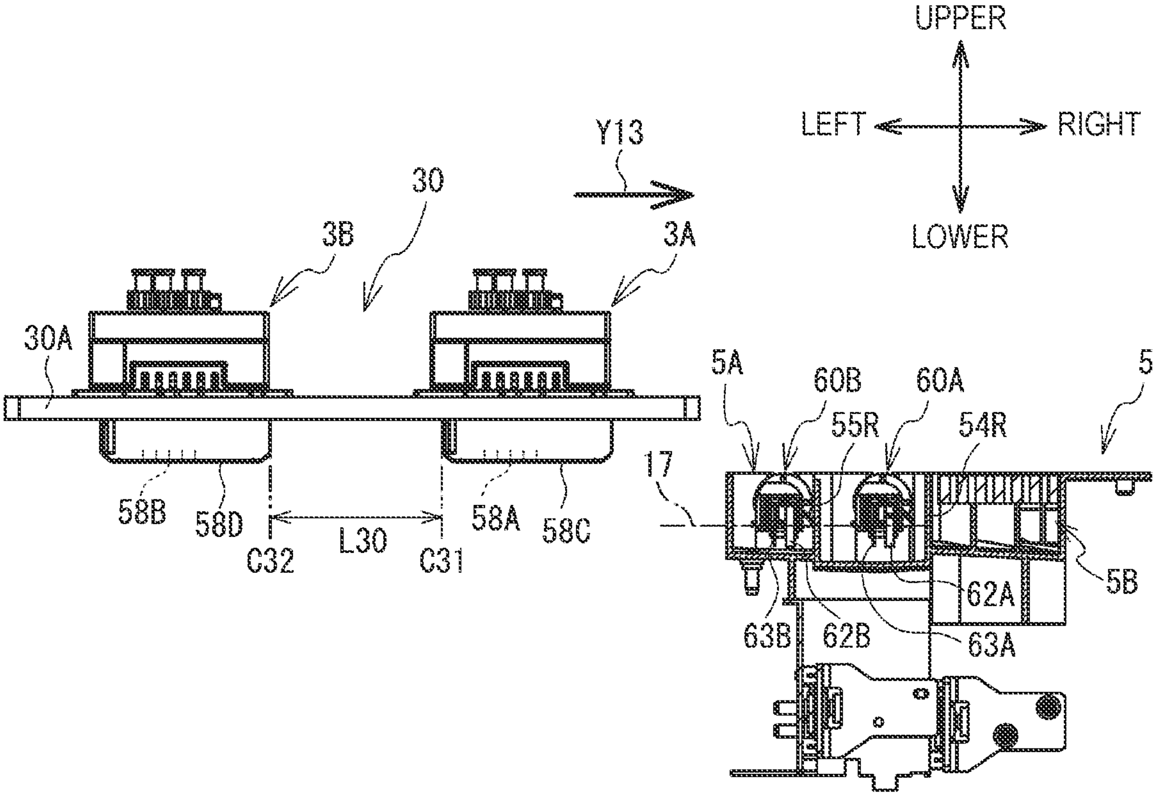
FIG. 11 shows a positional relationship between the cleaning assembly 5 and a carriage 30 when the carriage 30 is at a reference position.

The head 31 has a first head 31A and a second head 31B having a common structure. The first head 31A has a nozzle surface 58C (refer to FIG. 11) having a plurality of nozzles 58A on a lower surface. The second head 31B has a nozzle surface 58D (refer to FIG. 11) having a plurality of nozzles 58B on a lower surface. The nozzles 58A and 58B are arranged in plural in a horizontal direction. The white ink is ejected from the nozzles 58A. The color ink is ejected from the nozzles 58B. Positions of the nozzles 58A and 58B in the upper and lower direction are matched. The first head 31A and the second head 31B are aligned apart from each other in the main scanning direction. The first head 31A is arranged on a right side with respect to the second head 31B.

The head 32 has a first head 32A and a second head 32B. The first head 32A is located in front of the first head 31A. The second head 32B is located in front of the second head 31B.

The head 33 has a first head 33A and a second head 33B. The first head 33A is located in front of the first head 32A. The second head 33B is located in front of the second head 32B. The first heads 31A to 33A and the second heads 31B to 33B have a common structure. Positional relationships of the second head 32B with respect to the first head 32A and the second head 33B with respect to the first head 33A are common to a positional relationship of the second head 31B with respect to the first head 31A. Hereinafter, the first heads 31A, 32A and 33A are collectively referred to as 'first head 3A' when they are not distinguished from each other. The second heads 31B, 32B and 33B are collectively referred to as 'second head 3B' when they are not distinguished from each other.

<Cap Mechanism 40>

As shown in FIG. 2, the cap mechanism 40 has a support part 40A configured to support the cap 4. The support part

40A can be moved up and down by a cap drive unit 83D (refer to FIG. 10). The cap 41 has a first cap 41A and a second cap 41B. The cap 42 has a first cap 42A and a second cap 42B. The cap 43 has a first cap 43A and a second cap 43B.

The first cap 41A is located below the first head 31A in a state that the carriage 30 is moved to a left end of the movement path. The second cap 41B is located below the second head 31B. The first cap 42A is located below the first head 32A. The second cap 42B is located below the second head 32B. The first cap 43A is located below the first head 33A. The second cap 43B is located below the second head 33B. In the below, the position of the carriage 30 that has moved to the left end of the movement path is referred to as a reference position.

When the support part 40A is moved up in a state that the carriage 30 is at the reference position, each of the first caps 41A to 43A comes into close contact with the nozzle surfaces 58C of the first heads 31A to 33A to cover the nozzle 58A. Each of the second caps 41B to 43B comes into close contact with the nozzle surfaces 58D of the second heads 31B to 33B to cover the nozzles 58B. The cap 4 is configured to cover the nozzles 58A and 58B of the head 3 to suppress drying of the ink while printing is not performed on the printing medium in the printing apparatus 1.

<Cleaning Assembly 5>

As shown in FIG. 2, the cleaning assembly 5 is located between the cap mechanism 40 and the platen 12 in the main scanning direction. The cleaning assembly 5 includes cleaning assemblies 501 to 503, and for example, the cleaning assemblies 501 to 503 are located on the right side of caps 41 to 43, respectively. The cleaning assemblies 501, 502, and 503 are aligned in the front and rear direction. The cleaning assembly 502 is located in front of the cleaning assembly 501. The cleaning assembly 503 is located in front of the cleaning assembly 502. The cleaning assemblies 501 to 503 have a common structure. In FIG. 2, the cleaning assembly 501 has a first wiper 601A, a second wiper 601B, and a punching metal 59A. The cleaning assembly 502 has a first wiper 602A, a second wiper 602B, and a punching metal 59B. The cleaning assembly 503 has a first wiper 603A, a second wiper 603B, and a punching metal 59C. Respective upper sides of the first wipers 601A to 603A, the second wipers 601B to 603B, and the respective punching metals 59A to 59C are exposed.

The first wiper 601A is configured to wipe the nozzle surface 58C of the first head 31A. The second wiper 601B is configured to wipe the nozzle surface 58D of the second head 31B. The punching metal 59A is configured to cause the ink ejected from the first head 31A and the second head 31B to pass downward during flushing. The first wiper 602A is configured to wipe the nozzle surface 58C of the first head 32A. The second wiper 602B is configured to wipe the nozzle surface 58D of the second head 32B. The punching metal 59B is configured to cause the ink ejected from the first head 32A and the second head 32B to pass downward during flushing. The first wiper 603A is configured to wipe the nozzle surface 58C of the first head 33A. The second wiper 603B is configured to wipe the nozzle surface 58D of the second head 33B. The punching metal 59C is configured to cause the ink ejected from the first head 33A and the second head 33B to pass downward during flushing.

In the below, the first wipers 601A, 602A and 603A are collectively referred to as 'first wiper 60A' when they are not distinguished from each other. The second wipers 601B, 602B and 603B are collectively referred to as 'second wiper 60B' when they are not distinguished from each other. The first wiper 60A and the second wiper 60B are collectively referred to as 'wiper 60' when they are not distinguished from each other. The punching metals 59A, 59B and 59C are collectively referred to as 'punching metal 59' when they are not distinguished from each other.

Figure 4:
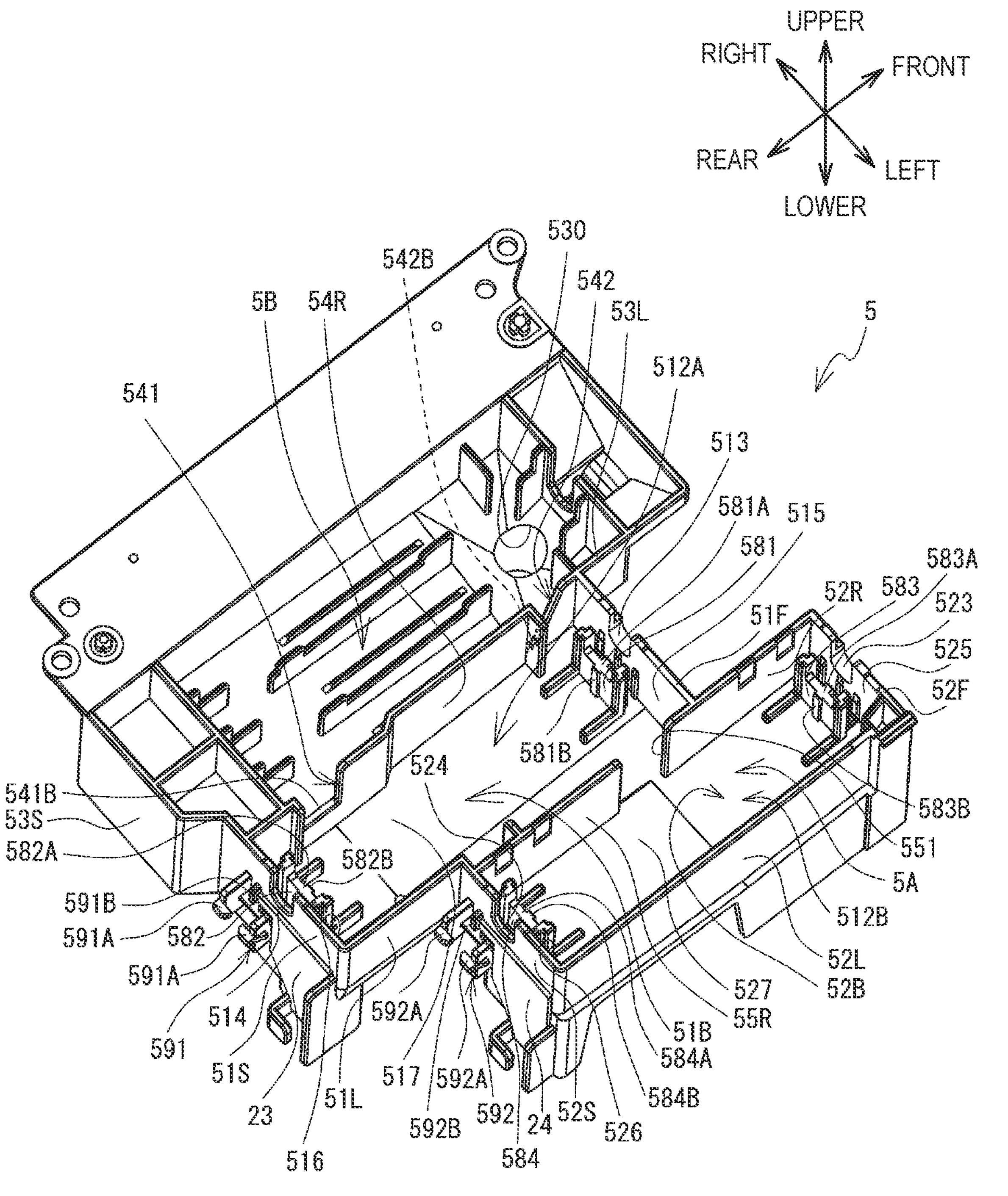
FIG. 4 is a perspective view showing a state in which an internal structure of the cleaning assembly 5 is removed.
Figure 5:
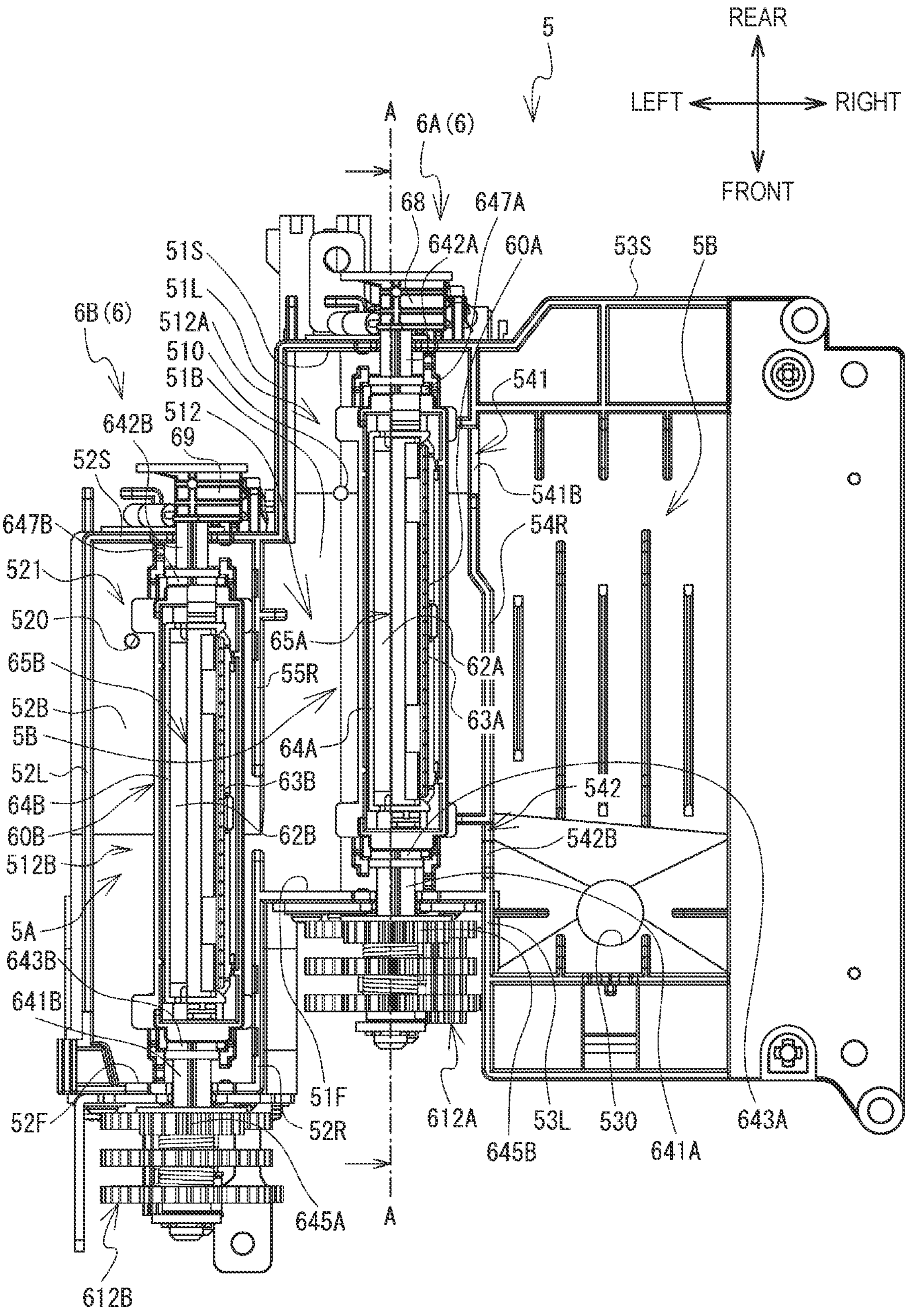
FIG. 5 is a plan view of the cleaning assembly 5.

As shown in FIGS. 3 to 6, the cleaning assembly 5 includes a cleaning liquid tank 5A, a flushing box 5B, a first wipe mechanism 6A, and a second wipe mechanism 6B. In the below, the first wipe mechanism 60A and the second wipe mechanism 6B are collectively referred to as 'wipe mechanism 6' when they are not distinguished from each other. The cleaning liquid tank 5A and the flushing box 5B are containers that can accommodate a cleaning liquid, respectively. The cleaning liquid tank 5A has accommodation spaces 512A and 512B for a cleaning liquid. In FIGS. 3 to 5, the punching metal 59 shown in FIG. 2 is omitted.

<Cleaning Liquid Tank 5A>

As shown in FIGS. 4 and 5, the cleaning liquid tank 5A has first peripheral walls 51L, 51F, 51S, 52L, 52F, 52S and 52R, a first sidewall 54R, a second sidewall 55R, first bottom walls 51B and 52B, an inlet 520 (refer to FIG. 5) and an outlet 510 (refer to FIG. 5). The first peripheral walls 51L, 51F and 51S, the first sidewall 54R, and the second sidewall 55R extend upward from the first bottom wall 51B to form the accommodation space 512A. The first peripheral walls 52L, 52F, 52S and 52R extend upward from the first bottom wall 52B to form the accommodation space 512B.

The first peripheral wall 52L is provided at a left end of the cleaning liquid tank 5A and extends in the front and rear direction. The first peripheral wall 52F extends rightward from a front end of the first peripheral wall 52L. The first peripheral wall 52R extends rearward from a right end of the first peripheral wall 52F. The first peripheral wall 51F extends rightward from a rear end of the first peripheral wall 52R. A right end of the first peripheral wall 51F is connected to a rear end of the second peripheral wall 53L of the flushing box 5B, which will be described later. The first peripheral wall 52S extends rightward from a rear end of the first peripheral wall 52L. The first peripheral wall 51L extends rearward from a right end of the first peripheral wall 52S. The first peripheral wall 51S extends rightward from a rear end of the first peripheral wall 51L. A right end of the first peripheral wall 51S is connected to a left end of the second peripheral wall 53S of the flushing box 5B, which will be described later. Heights of respective upper ends of the first peripheral walls 51L, 51F, 51S, 52L, 52F, 52S and 52R are the same.

As shown in FIG. 4, the first peripheral wall 51F is provided with a first concave portion 513. The first concave portion 513 is a concave portion that is concave downward from the upper end of the first peripheral wall 51F. The first peripheral wall 51S is provided with a first concave portion 514. The first concave portion 514 is a concave portion that is concave downward from the upper end of the first peripheral wall 51S.

As shown in FIG. 4, a support member 581 extending upward from the first bottom wall 51B is provided behind the first concave portion 513. The support member 581 is a wall part having a predetermined thickness in the front and rear direction, and an upper surface of the support member 581 is a support surface 581A extending in the front and rear direction and in the right and left direction. The support surface 581A is configured to support a rotating shaft 643A (refer to FIGS. 5 and 6), which will be described later. The support member 581 has support surface reinforcing members 581B having a predetermined thickness and a predetermined width, extending upward from the first bottom wall 51B to the support surface 581A and provided on the front side and the rear side, respectively. The support surface 581A is connected to the support surface reinforcing members 581B.

A support member 582 extending upward from the first bottom wall 51B is provided in front of the first concave portion 514. The support member 582 is a wall part having a predetermined thickness in the front and rear direction, and an upper surface of the support member 582 is a support surface 582A extending in the front and rear direction and in the right and left direction. The support surface 582A is configured to support a rotating shaft 647A, which will be described later. The support member 582 has support surface reinforcing members 582B having a predetermined thickness and a predetermined width, extending upward from the first bottom wall 51B to the support surface 582A and provided on the front side and the rear side, respectively. The support surface 582A is connected to the support surface reinforcing members 582B. The support surface 581A and the support surface 582A are provided in the cleaning liquid tank 5A.

The first peripheral wall 52F is provided with a second concave portion 523. The second concave portion 523 is a concave portion that is concave downward from the upper end of the first peripheral wall 52F. The first peripheral wall 52S is provided with a second concave portion 524. The second concave portion 524 is a concave portion that is concave downward from the upper end of the first peripheral wall 52S.

As shown in FIG. 4, a support member 583 extending upward from the first bottom wall 52B is provided behind the second concave portion 523. The support member 583 is a wall part having a predetermined thickness in the front and rear direction, and an upper surface of the support member 583 is a support surface 583A extending in the front and rear direction and in the right and left direction. The support surface 583A is configured to support a rotating shaft 643B (refer to FIG. 5), which will be described later. The support member 583 has support surface reinforcing members 583B having a predetermined thickness and a predetermined width, extending upward from the first bottom wall 52B to the support surface 583A and provided on the front side and the rear side, respectively. The support surface 583A is connected to the support surface reinforcing members 583B.

A support member 584 extending upward from the first bottom wall 51B is provided in front of the second concave portion 524. The support member 584 is a wall part having a predetermined thickness in the front and rear direction, and an upper surface of the support member 584 is a support surface 584A extending in the front and rear direction and in the right and left direction. The support surface 584A is configured to support a rotating shaft 647B (refer to FIG. 5), which will be described later. The support member 584 has support surface reinforcing members 584B having a predetermined thickness and a predetermined width, extending upward from the first bottom wall 52B to the support surface 584A and provided on the front side and the rear side, respectively. The support surface 584A is connected to the support surface reinforcing members 584B. Note that, the support surface reinforcing members 581B, 582B, 583B and 584B are provided at positions lower than a first bottom portion 541B and a first bottom portion 542B, which are lower portions of first communication portions 541 and 542 functioning as outlets for discharging the cleaning liquid from the cleaning liquid tank 5A to the flushing box 5B, as described later.

As shown in FIGS. 4 and 5, the first bottom wall 52B is connected to lower ends of the first peripheral walls 52L, 52F, 52S and 52R and the second sidewall 55R. As shown in FIG. 5, the inlet 520 is provided on a rear end-side of the first bottom wall 52B. An inflow hose (not shown) is connected to the inlet 520. The cleaning liquid flows from the inflow hose into the accommodation space 512B via the inlet 520, and the cleaning liquid flows from the accommodation space 512B into the accommodation space 512A via a second communication portion 551, which will be described later. Therefore, the cleaning liquid is accommodated and stored in the cleaning liquid tank 5A.

As shown in FIGS. 4 and 5, the first bottom wall 51B is connected to lower ends of the first peripheral walls 51L, 51F, 51S, the first sidewall 54R and the second sidewall 55R. As shown in FIG. 5, the outlet 510 is provided at a rear end of the first bottom wall 51B. A discharge hose (not shown) is connected to the outlet 510. The cleaning liquid accommodated in the accommodation space 512A of the cleaning liquid tank 5A flows through the discharge hose via the outlet 510 and is discharged to the outside.

As shown in FIGS. 4 and 5, the first sidewall 54R is connected to the right end of the first peripheral wall 51F and the right end of the first peripheral wall 51S. The first sidewall 54R is provided between the cleaning liquid tank 5A and the flushing box 5B, which will be described later, and partitions the cleaning liquid tank 5A and the flushing box 5B.

As shown in FIGS. 3 to 5, the first sidewall 54R has first communication portions 541 and 542. The first communication portions 541 and 542 are portions cut out downward from the upper end of the first sidewall 54R, respectively. A lower end of the first communication portion 541 is referred to as a first bottom portion 541B. A lower end of the first communication portion 542 is referred to as a first bottom portion 542B. The first bottom portion 541B is located at a position lower than the first bottom portion 542B.

When the cleaning liquid flows into the cleaning liquid tank 5A from the inlet 520, a liquid level L (refer to FIG. 6) of the cleaning liquid rises until it becomes the same height as the first bottom portion 541B. When the cleaning liquid further flows into the cleaning liquid tank, the cleaning liquid flows into the flushing box 5B via the first communication portion 541. The first bottom portion 542B is located at a position lower than the first concave portion 513. When the cleaning assembly 5 is tilted in a state of being located further lower on the front side than the rear side, the cleaning liquid flows from the first communication portion 542, not the first concave portion 513, into the flushing box 5B. Therefore, the first communication portions 541 and 542 function as outlets for discharging the cleaning liquid from the cleaning liquid tank 5A to the flushing box 5B. A height of the first bottom portion 541B coincides with the highest position of the liquid level of the cleaning liquid flowing into the cleaning liquid tank 5A. In the below, a virtual plane extending horizontally at the height of the first bottom portion 541B is referred to as a reference liquid level 17.

As shown in FIGS. 4 and 5, the second sidewall 55R is provided between the accommodation space 512A and the accommodation space 512B. The second sidewall 55R extends upward from the left end of the first bottom wall 51B and also extends forward from the first peripheral wall 52S. The second sidewall 55R has a second communication portion 551. The second communication portion 551 is a portion formed between the second sidewall 55R and the first peripheral wall 52R in the front and rear direction.

<Flushing Box 5B>

As shown in FIGS. 4 and 5, the flushing box 5B is connected to a right side of the cleaning liquid tank 5A. The flushing box 5B is configured to receive ink ejected from the head 3 by flushing. The flushing box 5B is configured to communicate with the cleaning liquid tank 5A via the first communication portions 541 and 542 of the first sidewall 54R. The flushing box 5B has a waste liquid port 530 for discharging the ejected ink.

<Wipe Mechanism 6>

As shown in FIGS. 3 and 5, the wipe mechanism 6 includes a first wipe mechanism 6A and a second wipe mechanism 6B. As shown in FIG. 5, the first wipe mechanism 6A includes a first wiper 60A, a first gear group 612A, and a first motor 611A (refer to FIG. 10). The first wiper 60A has a holding member 65A, a first foam wiper 62A, and a first rubber wiper 63A. The first foam wiper 62A and the first rubber wiper 63A are configured to come into contact with the nozzle surface 58C of the first head 3A to wipe the nozzle surface 58C. The first motor 611A is configured to move a position of the first wiper 60A between a first contact position (refer to FIG. 3) and a first non-contact position (refer to FIG. 11), which will be described later.

The second wipe mechanism 6B includes a second wiper 60B, a second gear group 612B, and a second motor 611B (refer to FIG. 10). The second wiper 60B has a holding member 65B, a second foam wiper 62B, and a second rubber wiper 63B. The second foam wiper 62B and the second rubber wiper 63B are configured to come into contact with the nozzle surface 58D of the second head 3B to wipe the nozzle surface 58D. The second motor 611B is configured to move a position of the second wiper 60B between a second contact position (refer to FIG. 3) and a second non-contact position (refer to FIG. 11), which will be described later. The configurations of the first wipe mechanism 6A and the second wipe mechanism 6B are the same. In the below, the first wipe mechanism 6A is described, and the description of the second wipe mechanism 6B is omitted. Further, unless otherwise specified, the description will be made on the premise that the first wiper 60A is arranged at the first contact position.

Figure 6:
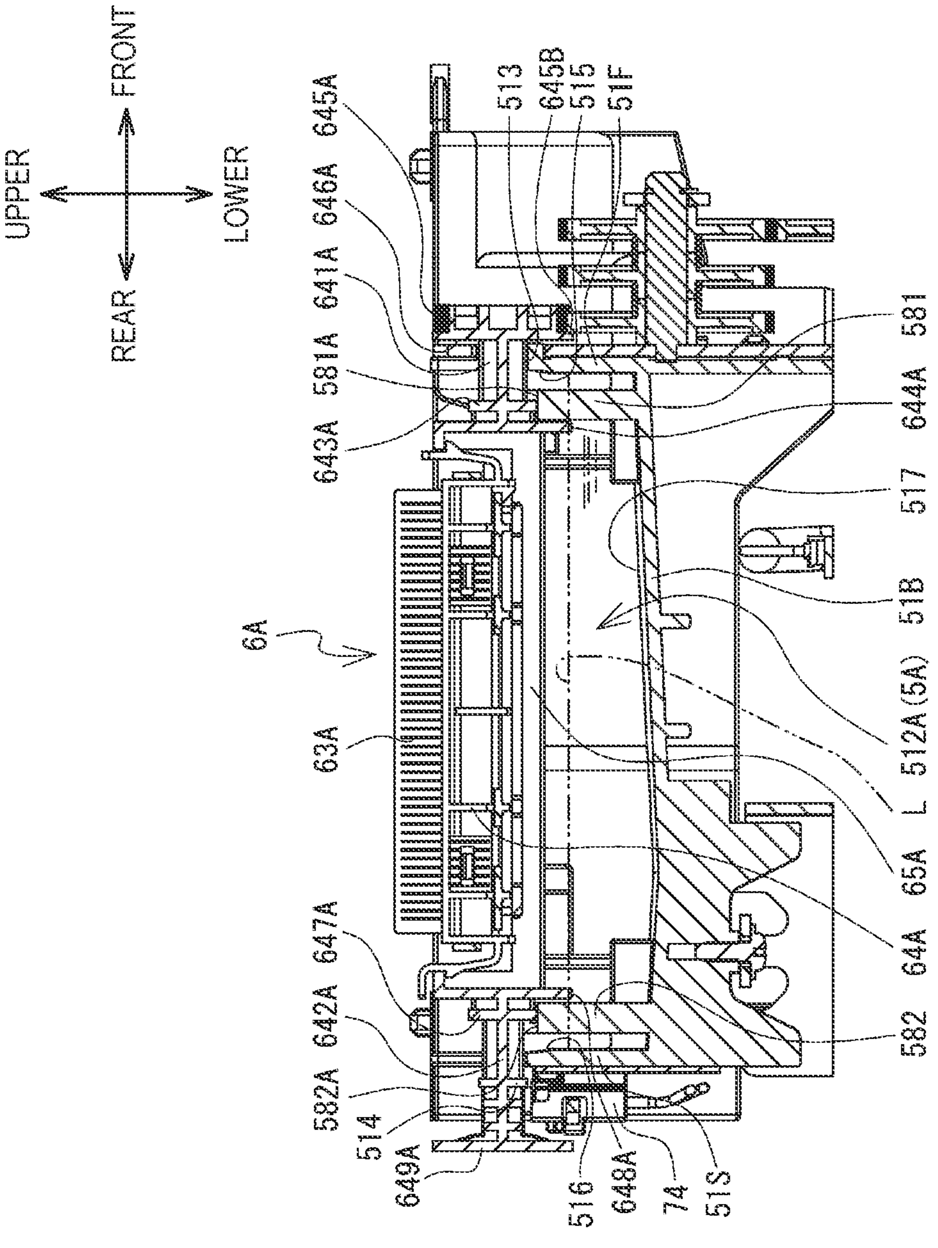
FIG. 6 is a sectional view of the cleaning assembly 5, as seen from an arrow direction along a line A-A in FIG. 5.

As shown in FIGS. 5 and 6, the holding member 65A of the first wipe mechanism 6A is provided in the accommodation space 512A inside the cleaning liquid tank 5A, extends in the front and rear direction, and has a base part 64A, a rotating shaft 641A, a rotating shaft 643A, a rotating shaft 642A and a rotating shaft 647A. The holding member 65A is configured to hold the first foam wiper 62A, the first rubber wiper 63A, and the base part 64A. The base part 64A is configured to fix the first foam wiper 62A and the first rubber wiper 63A so as not to be positionally misaligned. The base part 64A is detachably held by the holding member 65. The rotating shaft 641A extends forward from a front end-side of the base part 64A in a state that the base part 64A is held by the holding member 65. As shown in FIG. 6, the rotating shaft 641A enters the first concave portion 513 of the first peripheral wall 51F from the rear and protrudes forward. A portion of the rotating shaft 641A on the base part 64A-side is configured as a rotating shaft 643A having a diameter larger than the other portion of the rotating shaft 641A. The rotating shaft 643A is rotatably supported by the support surface 581A of the support member 581. The rotating shaft 642A extends rearward from a rear end-side of the base part 64A in the state that the base part 64A is held by the holding member 65. The rotating shaft 642A enters the first concave portion 514 (refer to FIG. 4) of the first peripheral wall 51S from the front and protrudes rearward. A portion of the rotating shaft 642A on the base part 64A-side is configured as a rotating shaft 647A having a diameter larger than the other portion of the rotating shaft 642A. The rotating shaft 647A is rotatably supported by the support surface 582A of the support member 582. Further, a portion of the rotating shaft 641A on the front end-side and a portion of the rotating shaft 642A on the rear end-side are located outside the cleaning liquid tank 5A, respectively. That is, the holding member 65A extends from the outside of the cleaning liquid tank 5A into the cleaning liquid tank 5A. The support surface 581A and the support surface 582A are provided at positions higher than the first bottom portion 541B of the first communication portion 541 and the first bottom portion 542B of the first communication portion 542. That is, the support surface 581A and the support surface 582A are provided at positions higher than the first bottom portions 541B and 542B, which are the lower portions of the first communication portions 541 and 542 configured to function as outlets.

As shown in FIG. 6, the rotating shaft 643A of the rotating shaft 641A has a diameter larger than the other portion of the rotating shaft 641A. Therefore, between the support surface 581A and a side surface 515 of the first peripheral wall 51F of the cleaning liquid tank, the support surface 581A is configured to support the lowest sides of the rotating shaft 641A and the rotating shaft 643A as the holding member 65A extending from the outside of the cleaning liquid tank 5A into the cleaning liquid tank 5A. That is, between the support surface 581A and the side surface 515 of the cleaning liquid tank 5A, the holding member 65A is located on a further upper side than the support surface 581A. The rotating shaft 647A of the rotating shaft 642A has a diameter larger than the other portion of the rotating shaft 642A. Therefore, between the support surface 582A and a side surface 516 of the first peripheral wall 51S of the cleaning liquid tank, the support surface 582A is configured to support the lowest sides of the rotating shaft 642A and the rotating shaft 647A as the holding member 65A extending from the outside of the cleaning liquid tank 5A into the cleaning liquid tank 5A. That is, between the support surface 582A and the side surface 516 of the cleaning liquid tank 5A, the holding member 65A is located on a further upper side than the support surface 582A. The first peripheral wall 52F of the cleaning liquid tank 5A is provided with a side surface 525, and the first peripheral wall 52S is provided with a side surface 526. A relationship of the support surface 583A and the support surface 584A with respect to the holding member 65B is similar to the support surface 581A and the support surface 582A with respect to the holding member 65A. Further, as shown in FIG. 3, at the first contact position, the first foam wiper 62A, the first rubber wiper 63A, the second foam wiper 62B, and the second rubber wiper 63B are provided inside the cleaning liquid tank 5A even when at least portions of the first foam wiper 62A, the first rubber wiper 63A, the second foam wiper 62B, and the second rubber wiper 63B are located inside the cleaning liquid tank 5A, and the other portions are outside the cleaning liquid tank 5A.

As shown in FIGS. 5 and 6, the gear 645A is connected to a portion of the rotating shaft 641A, which protrudes further forward than the first peripheral wall 51F. The gear 645A is in mesh with the first gear group 612A, which will be described later. In addition, a disk part 645B is provided behind the gear 645A. The disk part 645B is apart from the first peripheral wall 51F. Therefore, a possibility that the cleaning liquid in the cleaning liquid tank 5A will adhere to the disk part 645B is reduced. A rotor 68 (refer to FIG. 5) is connected to a portion of the rotating shaft 642A, which protrudes further rearward than the first peripheral wall 51S. The rotor 68 can come into contact with a contact 73A (refer to FIG. 3) of a first sensor 73, which will be described later. Similarly, a rotor 69 (refer to FIG. 5) can come into contact with a contact 74A (refer to FIG. 3) of a second sensor 74, which will be described later.

The first foam wiper 62A has a plate shape extending in the front and rear direction. The first foam wiper 62A is a wiper made of a porous material such as a foamed resin, for example, and has a water-absorbing property. The first rubber wiper 63A is arranged on a right side with respect to the first foam wiper 62A. The first rubber wiper 63A has a plate-shaped support portion extending in the front and rear direction, and extends upward from the support portion. A groove extending in the upper and lower direction is formed on a right surface of the first rubber wiper 63A. The first rubber wiper 63A is made of rubber. A portion of the first foam wiper 62A ranging from a center to a lower end in the upper and lower direction and the support portion of the first rubber wiper 63A are fixed by the base part 64A. The first foam wiper 62A, and a portion of the first foam wiper 62A ranging from a substantial center to an upper end in the upper and lower direction protrude upward from the base part 64A.

As shown in FIGS. 3 to 5, the first motor 611A (refer to FIG. 10) is provided below the accommodation space 512A of the cleaning liquid tank 5A. The first motor 611A is, for example, a stepping motor. The first gear group 612A is configured to transmit power of the first motor 611A to the first wiper 60A to rotate the first wiper 60A. The first wiper 60A is configured to move between the first contact position (refer to FIG. 3) and the first non-contact position (refer to FIG. 11) by rotation. A rotation direction when the first wiper 60A rotates from the first contact position toward the first non-contact position is not limited, but in the present embodiment, is a counterclockwise direction, when seen from the front. A rotation direction when the first wiper 60A rotates from the first non-contact position toward the first contact position is not limited, but in the present embodiment, is a clockwise direction, when seen from the front.

<Contact Position>

As shown in FIG. 5, at the first contact position and the second contact position, the second foam wiper 62B, the second rubber wiper 63B, the first foam wiper 62A, and the first rubber wiper 63A are aligned in this order from the left toward the right. Respective tips of the first foam wiper 62A and the first rubber wiper 63A at the first contact position and the second foam wiper 62B and the second rubber wiper 63B at the second contact position face upward, and protrude further upward than the upper ends of the first peripheral walls 51L, 51F, 51S, 52L, 52F, 52S and 52R (refer to FIG. 3) of the cleaning liquid tank 5A. That is, the first contact position is a position where the first foam wiper 62A and the first rubber wiper 63A protrude upward and can come into contact with the nozzle surface 58C of the first head 3A. The second contact position is a position where the second foam wiper 62B and the second rubber wiper 63B protrude upward and can come into contact with the nozzle surface 58D of the second head 3B. At the first contact position and the second contact position, the first foam wiper 62A, the first rubber wiper 63A, the second foam wiper 62B, and the second rubber wiper 63B are each located above the reference liquid level 17. Therefore, when the cleaning liquid is accommodated in the accommodation spaces 512A and 512B of the cleaning liquid tank 5A, the first foam wiper 62A, the first rubber wiper 63A, the second foam wiper 62B, and the second rubber wiper 63B do not come into contact with the cleaning liquid, respectively. In the below, the first contact position and the second contact position are collectively referred to as 'contact position' when they are not distinguished from each other.

<Non-Contact Position>

The respective tips of the first foam wiper 62A and the first rubber wiper 63A at the first non-contact position and the second foam wiper 62B and the second rubber wiper 63B at the second non-contact position face downward. The first foam wiper 62A, the first rubber wiper 63A, the second foam wiper 62B, and the second rubber wiper 63B are respectively located below the upper ends of the first peripheral walls 51L, 51F, 51S, 52L, 52F, 52S and 52R (refer to FIG. 3) of the cleaning liquid tank 5A. That is, the first non-contact position is a position where the first foam wiper 62A and the first rubber wiper 63A face downward and cannot come into contact with the nozzle 58A of the first head 3A. The second contact position is a position where the second foam wiper 62B and the second rubber wiper 63B face downward and cannot come into contact with the nozzle 58B of the second head 3B. At the first non-contact position and the second non-contact position, the first wiper 60A is accommodated in the accommodation space 512A of the cleaning liquid tank 5A, and the second wiper 60B is accommodated in the accommodation space 512B of the cleaning liquid tank 5A.

The first foam wiper 62A and the first rubber wiper 63A at the first non-contact position, and the second foam wiper 62B and the second rubber wiper 63B at the second non-contact position are located below the reference liquid level 17, respectively. Therefore, when the cleaning liquid is accommodated in the accommodation spaces 512A and 512B of the cleaning liquid tank 5A, the first foam wiper 62A, the first rubber wiper 63A, the second foam wiper 62B, and the second rubber wiper 63B come into contact with the cleaning liquid, respectively. In the below, the first non-contact position and the second non-contact position are collectively referred to as 'non-contact position' when they are not distinguished from each other. At the non-contact position, each of the wipers 62A, 63A, 62B and 63B does not have to come into contact with the nozzles 58A and 58B of the respective heads 3A, 3B, and may not face downward, such as facing in the front and rear direction.

As shown in FIG. 6, the holding member 65A includes a guide portion 644A behind the support surface 581A of the cleaning liquid tank 5A, and a guide portion 648A in front of the support surface 582A of the cleaning liquid tank 5A. That is, the guide portions 644A and 648A are provided between the first foam wiper 62A and the first rubber wiper 63A and the support surfaces 581A and 582A, respectively. When the first foam wiper 62A and the first rubber wiper 63A are not in contact with the cleaning liquid, that is, when they are at the first contact position, the guide portions 644A and 648A extend toward the bottom surface 517 of the first bottom wall 51B of the cleaning liquid tank 5A. The guide portion 644A is located below the support surface 581A, for example, and the guide portion 648A is located below the support surface 582A. As shown in FIG. 6, the liquid level L of the cleaning liquid tank 5A is the maximum height of the cleaning liquid. At this time, at least portions of the guide portions 644A and 648A come into contact with the cleaning liquid in the cleaning liquid tank 5A. The second wipe mechanism 6B has a similar structure, and the holding member 65B (refer to FIG. 5) has guide portions (not shown) extending toward the bottom surface 527 of the first bottom wall 52B of the cleaning liquid tank 5A and provided behind the support surface 583A (refer to FIG. 4) of the cleaning liquid tank 5A and in front of the support surface 584A (refer to FIG. 4) of the cleaning liquid tank 5A, respectively. Note that, when the first foam wiper 62A and the first rubber wiper 63A are in a non-contact state, they may come into contact with the cleaning liquid in the cleaning liquid tank 5A.

<First Sensor 73 and Second Sensor 74>

As shown in FIG. 3, a first sensor 73 is provided on a rear surface of the first peripheral wall 51S of the cleaning liquid tank 5A, and a second sensor 74 is provided on a rear surface of the first peripheral wall 52S. The first sensor 73 and the second sensor 74 are contact-type position sensors having contacts 73A and 74A protruding upward, respectively.

In a state that the first wiper 60A is at the first contact position, the rotor 68 comes into contact with the contact 73A of the first sensor 73 from above. Since the rotor 68 is formed so as to protrude only partially in a radial direction from a shaft center of the rotating shaft 642A, when the first wiper 60A moves from the first contact position to the first non-contact position, the rotor 68 rotates in a clockwise direction, as seen from the rear, and separates from the contact 73A of the first sensor 73. That is, the rotor 68 is separated upward with respect to the contact 73A of the first sensor 73 in a state that the first wiper 60A is not at the first contact position.

In a state that the second wiper 60B is at the second contact position, the rotor 69 comes into contact with the contact 74A of the second sensor 74 from above. Since the rotor 69 is formed so as to protrude only partially in a radial direction from a shaft center of the rotating shaft 642B, when the second wiper 60A moves from the second contact position to the second non-contact position, the rotor 69 rotates in the clockwise direction, as seen from the rear, and separates from the contact 74A of the second sensor 74. That is, the rotor 69 is separated leftward with respect to the contact 74A of the second sensor 74 in a state that the second wiper 60B is not at the second contact position.

<Sensor Holding Part>

As shown in FIG. 4, a sensor holding part 591 configured to hold the first sensor 73 is provided on the rear surface of the first peripheral wall 51S. The sensor holding part 591 includes a pair of ribs 591A protruding rearward from the first peripheral wall 51S and configured to hold the first sensor 73, and a rib 591B provided between the pair of ribs 591A. The ribs 591A of the sensor holding part 591 are provided below the first concave portion 514. For example, the rib 591A is apart downward from the first concave portion 514 by 5 mm. The rib 591B is configured to arrange, for example, the first sensor 73 at a position spaced by 1 mm rearward from the first peripheral wall 51S. Therefore, since the first sensor 73 is apart from the first concave portion 514, a possibility that the cleaning liquid adhering to the first concave portion 514 will flow through the first sensor 73 can be reduced. In addition, a sensor holding part 592 configured to hold the second sensor 74 also has a similar configuration to the sensor holding part 591.

Figure 7:
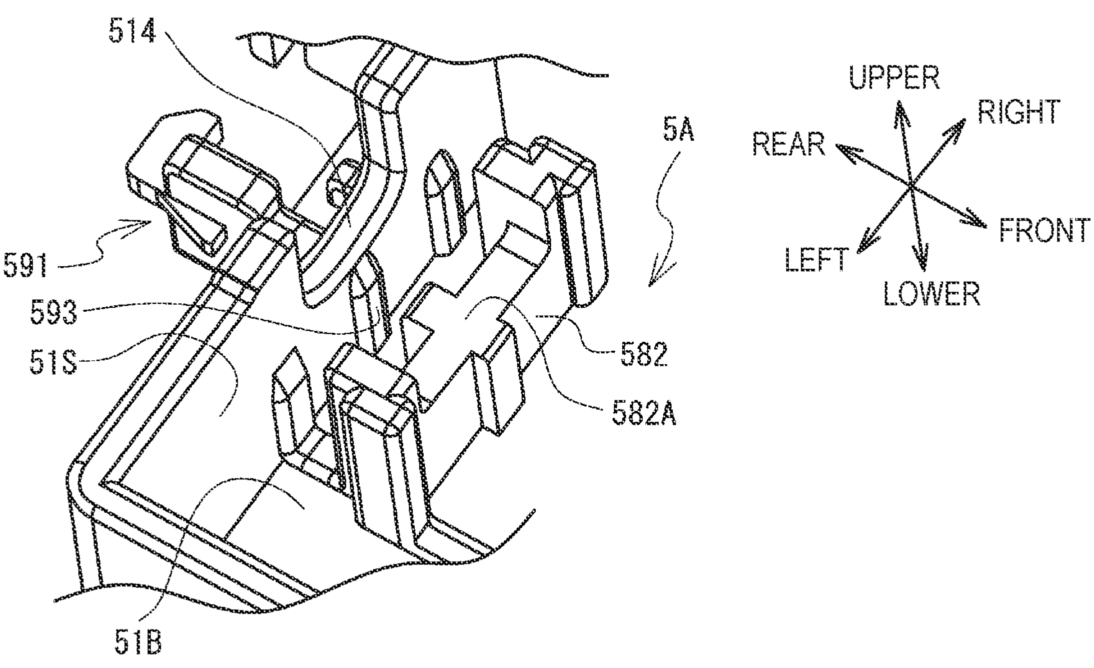
FIG. 7 is a perspective view of a sensor holding part 591.

As shown in FIG. 7, a rib 593 is provided in the cleaning liquid tank 5A from the first concave portion 514 toward the first bottom wall 51B. The cleaning liquid adhering to a lower end portion of the first concave portion 514 is transferred along the rib 593 and can easily flow into the cleaning liquid tank 5A. The second concave portion 524 may also be provided with a rib (not shown) in a similar manner.

<Shielding Member 7>

Figure 8:
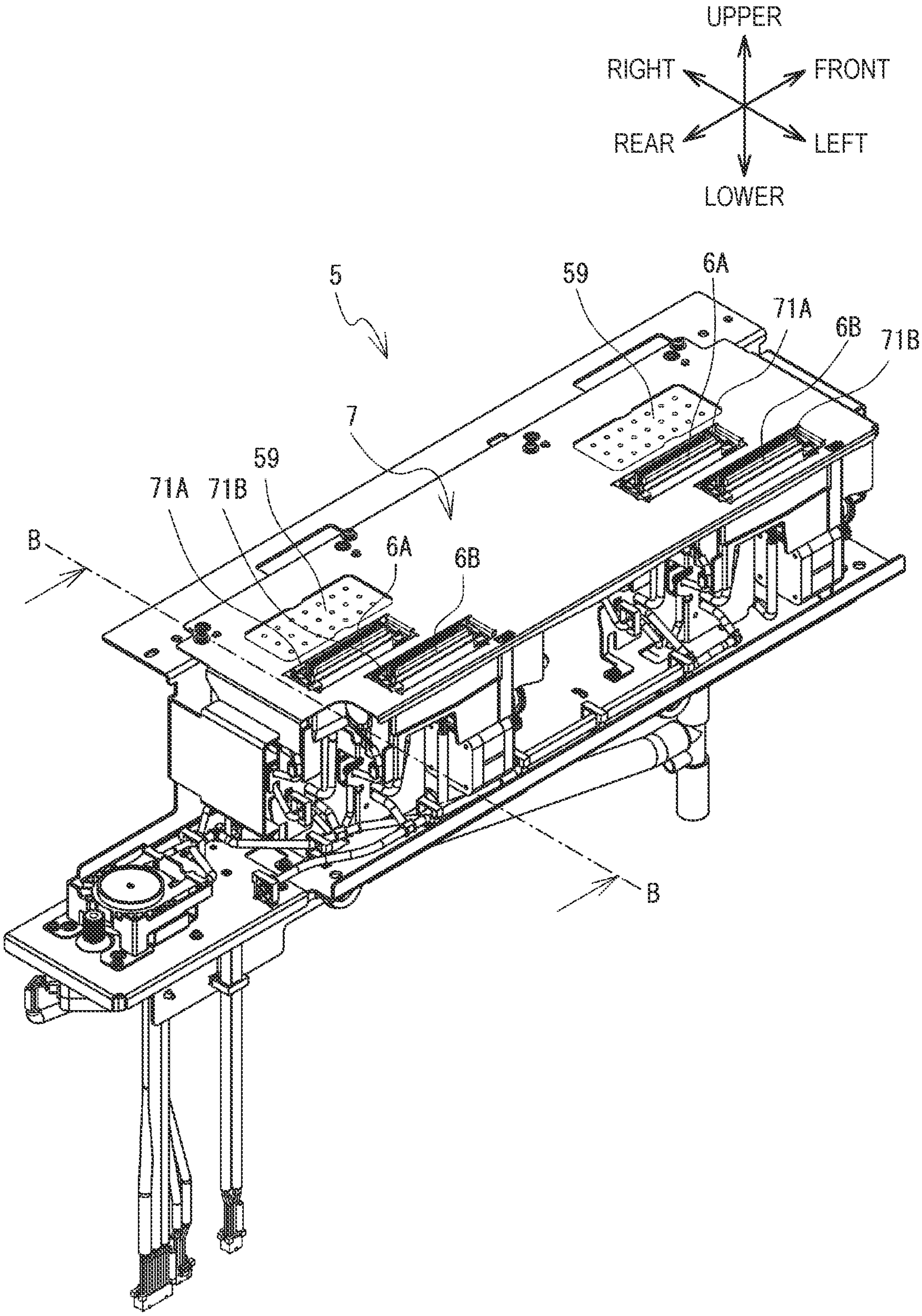
FIG. 8 is a perspective view of the cleaning assembly 5 in a state in which a shielding member 7 is provided.

As shown in FIG. 8, a shielding member 7 is provided on an upper surface of the cleaning assembly 5. The shielding member 7 is a plate-shaped member extending in the front and rear and right and left directions, and is configured to close upper parts of the cleaning liquid tank 5A and the flushing box 5B. Therefore, the shielding member 7 is provided above the holding member 65A, and is configured to shield the first motor 611A and the second motor 611B from the liquid scattered due to the wiping on the nozzle surfaces 58C and 58D by the wipers 62A, 62B, 63A and 63B and the mist of ink ejected from the head 3. In addition, the shielding member 7 has opening portions 71A and 71B. The opening portion 71A is provided at an upper portion of the first wipe mechanism 6A, and is opened in a rectangular shape that is long in the front and rear direction and has a size that does not interfere with a moving locus when the first wiper 60A rotates and moves between the contact position and the non-contact position. The size that does not interfere is a size that the first wiper 60A does not collide with an edge of the opening portion 71A even when the first wiper 60A rotates and moves between the contact position and the non-contact position. The opening portion 71B is provided at an upper portion of the second wiper 60B, and is opened with a size that does not interfere with a moving locus when the second wiper 60B rotates and moves between the contact position and the non-contact position.

As shown in FIGS. 3 and 4, the printing apparatus 1 has absorption members 23 and 24 configured to absorb the cleaning liquid leaked below the shaft portions of the holding members 65A and 65B (refer to FIG. 5) and provided on the first peripheral walls 51S, 52S, 51F and 52F, respectively. Therefore, the absorption members 23 and 24 can absorb and collect the cleaning liquid leaking below each of the concave portions 514, 524, 513, and 523. Further, the absorption members 23 and 24 may have a guide portion configured to guide the leaked cleaning liquid. In this case, the guide portion guides the cleaning liquid exuded from the absorption members 23 and 24 to a storage unit (not shown). Therefore, it is possible to reduce contamination caused due to the cleaning liquid exuded from the absorption members 23 and 24.

Figure 9:
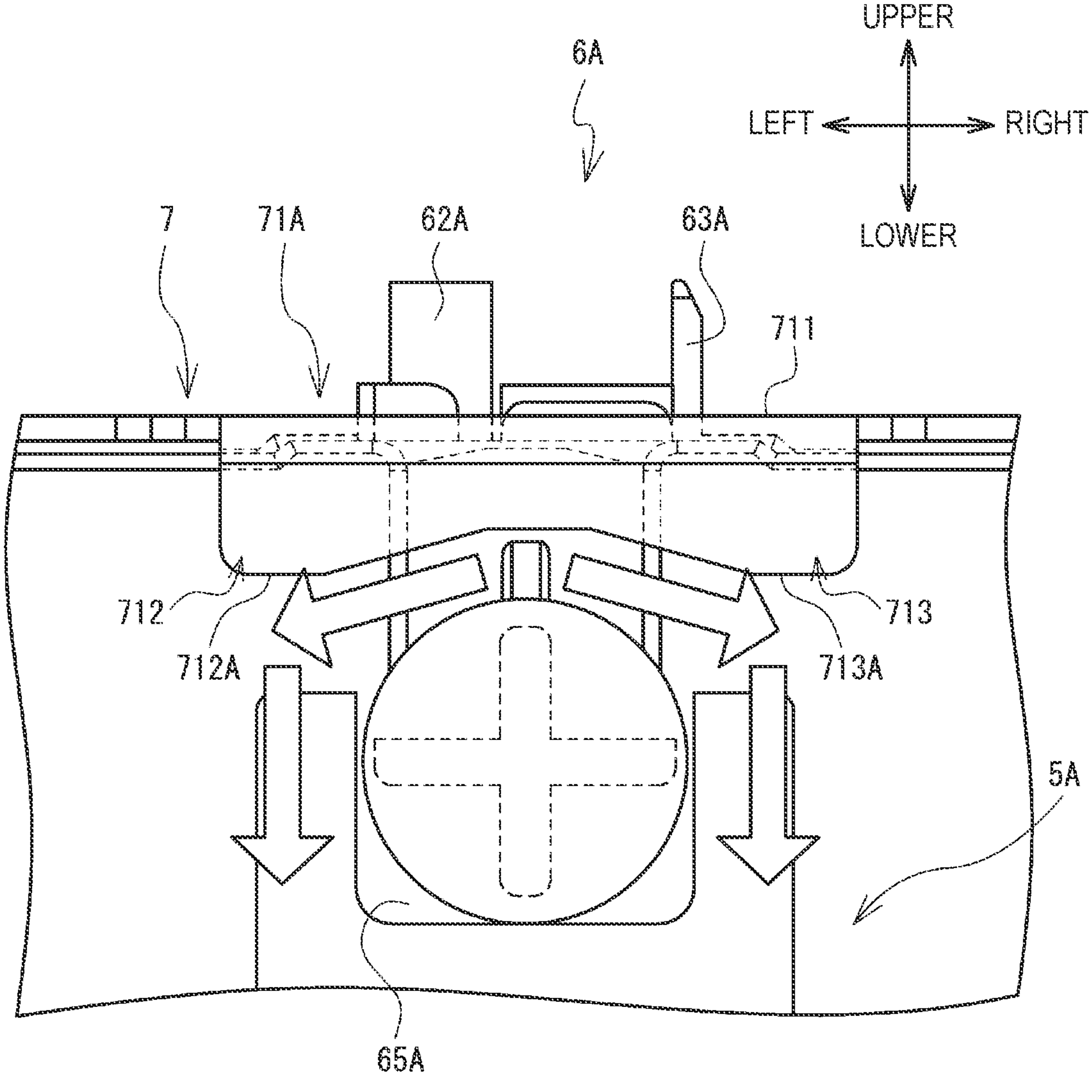
FIG. 9 is a sectional view, as seen from an arrow direction along a line B-B in FIG. 8.

As shown in FIG. 9, the shielding member 7 has convex portions 712 and 713 protruding convexly downward and provided at least at portions of an opening edge portion 711 forming the opening portion 71A. The convex portions 712 and 713 are provided at a portion where is inside the cleaning liquid tank 5A and inner than the first peripheral walls 51F and 51S of the cleaning liquid tank 5A. The convex portions 712 and 713 have lowest points 712A and 713A, respectively, at points other than above the holding member 65A. Therefore, the liquid adhering to the shielding member 7 falls downward via the convex portions 712 and 713. In addition, a possibility that the liquid adhering to the shielding member 7 will fall onto the holding member 65A is reduced.

<Electrical Configuration>

An electrical configuration of the printing apparatus 1 is described with reference to FIG. 10. The printing apparatus 1 includes a CPU 80 configured to control the printing apparatus 1. The CPU 80 is electrically connected to a ROM 81, a RAM 82, a head drive unit 83A, a main scanning drive unit 83B, a sub-scanning drive unit 83C, a cap drive unit 83D, an ASIC 84, a display control unit 151, an operation processing unit 152, a supply mechanism 76A, and a discharge mechanism 76B, a first motor 611A, a second motor 611B, a first sensor 73, and a second sensor 74, via a bus 80A.

The ROM 81 is configured to storage a control program, initial values, and the like for the CPU 80 to control an operation of the printing apparatus 1. In the RAM 82, a variety of data, flags and the like that are used for the control program are temporarily stored. The ASIC 84 is configured to control the head drive unit 83A, the main scanning drive unit 83B, the sub-scanning drive unit 83C, and the cap drive unit 83D. The head drive unit 83A is configured to drive the piezoelectric element provided in the head 3 (the first head 3A and the second head 3B) configured to eject ink, thereby ejecting ink from the nozzles. The main scanning drive unit 83B includes at least the main scanning motor 831B, and is configured to move the carriage 30 in the main scanning direction by drive of the main scanning motor 831B. The sub-scanning drive unit 83C includes at least the platen motor 831C, and is configured to move the platen 12 and the tray 13 (refer to FIG. 1) in the sub-scanning direction by drive of the platen motor 831C. The cap drive unit 83D includes at least a cap motor 831D, and is configured to move the cap mechanism 40 in the upper and lower direction by drive of the cap motor 831D. The main scanning motor 831B, the platen motor 831C, and the cap motor 831D are stepping motors.

The display control unit 151 is configured to drive the display 15A of the operation unit 15 under control of the CPU 80, thereby displaying an image. The operation processing unit 152 is configured to detect an operation on the operation button 15B of the operation unit 15. A pump 78 of the supply mechanism 76A is configured to supply the cleaning liquid to the cleaning liquid tank 5A via the inflow hose between the pump and the inlet 520. For the pump 78, for example, a tube pump is used. A solenoid 77 is configured to open/close a valve provided to the inflow hose. A solenoid 79 of the discharge mechanism 76B is configured to open/close a valve provided to the discharge hose connected to the outlet 510. The first motor 611A is configured to drive the holding member 65A by drive, thereby moving the first wiper 60A between the first contact position and the first non-contact position. The second motor 611B is configured to drive the holding member 65B by drive, thereby moving the second wiper 60B between the second contact position and the second non-contact position. The first sensor 73 is configured to output an ON signal in a state that the rotor 68 is in contact with the contact 73A, and to output an OFF signal in a state that the rotor 68 is not in contact with the contact 73A. The second sensor 74 is configured to output an ON signal in a state that the rotor 69 is in contact with the contact 74A, and to output an OFF signal in a state that the rotor 69 is not in contact with the contact 74A.

<Periodic Processing>

Periodic processing that is executed by the CPU 80 of the printing apparatus 1 is described. The CPU 80 periodically executes periodic processing by reading and executing a control program stored in the ROM 81 at a predetermined cycle (for example, 24 hours). Note that, at the start of the periodic processing, the cleaning liquid is held in the cleaning liquid tank 5A, the solenoid 77 of the supply mechanism 76A closes the valve of the inflow hose connected to the inlet 520, the pump 78 stops drive, and the solenoid 79 of the discharge mechanism 76B closes the valve of the discharge hose connected to the outlet 510. The CPU 80 drives the first motor 611A and the second motor 611B to rotate the first wiper 60A and the second wiper 60B between the contact position and the non-contact position by a prescribed number of times, thereby cleaning the first wiper 60A and the second wiper 60B by the cleaning liquid.

Operations and Effects of Present Embodiment

The printing apparatus 1 of the above-described embodiment includes the cleaning assembly 5. In the cleaning assembly 5, the first foam wiper 62A and the first rubber wiper 63A and the second foam wiper 62B and the second rubber wiper 63B configured to wipe the nozzle surfaces 58C and 58D on which the nozzles 58A and 58B are formed, respectively, are provided inside the cleaning liquid tank 5A. The holding member 65A extends from the outside of the cleaning liquid tank 5A into the cleaning liquid tank 5A and holds the first foam wiper 62A and the first rubber wiper 63A. In addition, the holding member 65B extends from the outside of the cleaning liquid tank 5A into the cleaning liquid tank 5A and holds the second foam wiper 62B and the second rubber wiper 63B. The first motor 611A drives the holding member 65A, and the second motor 611B drives the holding member 65B. The support surfaces 581A and 582A provided inside the cleaning liquid tank 5A support the holding member 65A, and the support surfaces 583A and 584A support the holding member 65B. Therefore, the cleaning liquid adhering to the holding member 65A returns to the cleaning liquid tank 5A via the support surfaces 583A and 584A. In addition, the cleaning liquid adhering to the holding member 65B returns to the cleaning liquid tank 5A via the support surfaces 581A and 582A. Therefore, a possibility that the cleaning liquid adhering to the holding members 65A and 65B leaks to the outside of the cleaning liquid tank 5A can be reduced.

The support surface 581A and the support surface 582A are provided at positions higher than the first bottom portion 541B of the first communication portion 541 and the first bottom portion 542B of the first communication portion 542 configured to function as outlets for discharging the cleaning liquid from the cleaning liquid tank 5A to the flushing box 5B. Since the cleaning liquid is discharged from the cleaning liquid tank 5A to the flushing box 5B from the first communication portions 541 and 542, the maximum height of the liquid level of the cleaning liquid in the cleaning liquid tank 5A is the positions of the first bottom portion 541B and the first bottom portion 542B. Therefore, the support surface 581A and the support surface 582A are located higher than the liquid level L of the cleaning liquid. Therefore, the cleaning liquid adhering to the support surfaces 581A and 582A flows downward from the support surfaces 581A and 582A and returns to the cleaning liquid tank 5A, and therefore, the possibility that the cleaning liquid leaks to the outside of the cleaning liquid tank 5A can be reduced. The same also applies to the cleaning liquid adhering to the support surfaces 583A and 584A.

The cleaning liquid tank 5A has the side surfaces 515, 516, 525 and 526, the bottom surfaces 517 and 527, the support surface reinforcing members 581B and 582B extend from the bottom surface 517, and the support surface reinforcing members 583B and 584B extend from the bottom surface 527. The support surfaces 581A to 584A are connected to the support surface reinforcing members 581B to 584B, respectively. Therefore, the support surfaces 581A to 584A are reinforced by the connected support surface reinforcing members 581B to 584B, and the cleaning liquid is transferred from the holding members 65A and 65B along the support members 581 to 584 via the support surfaces 581A to 584A and can return to the cleaning liquid tank 5A. Therefore, the possibility that the cleaning liquid leaks to the outside of the cleaning liquid tank 5A can be reduced.

As shown in FIG. 4, the support surface reinforcing members 581B to 584B are provided at positions lower than the first bottom portion 541B and the first bottom portion 542B of the first communication portions 541 and 542. Therefore, the maximum height of the liquid level L of the cleaning liquid in the cleaning liquid tank 53A is the positions of the first bottom portion 541B and the first bottom portion 542B of the first communication portions 541 and 542 configured to function as the outlet of the cleaning liquid from the cleaning liquid tank 5A to the flushing box 5B. Since the support surface reinforcing members 581B to 584B are provided at positions lower than the lower portion of the outlet of the cleaning liquid tank 5A, the supporting surface reinforcing members 581B to 584B do not interfere with the returning of the cleaning liquid on the support surfaces 581A to 584A to the cleaning liquid in the cleaning liquid tank 5A. Therefore, the possibility that the cleaning liquid leaks to the outside of the cleaning liquid tank 5A can be reduced.

As shown in FIG. 6, between the support surface 581A and the side surface 515 of the cleaning liquid tank 5A, the support surface 581A may support the lowest side of the holding member 65A extending from the outside of the cleaning liquid tank 5A into the cleaning liquid tank 5A. That is, between the support surface 581A and the side surface 515 of the cleaning liquid tank 5A, the holding member 65A is located on a further upper side than the support surface 581A. Therefore, a possibility that the cleaning liquid leaks from the support surface 581A to the outside of the cleaning liquid tank 5A via the holding member 65A can be reduced. The same also applies between the support surfaces 582A to 584A and the side surfaces 516, 525 and 526 of the cleaning liquid tank 5A.

As shown in FIG. 6, when the first foam wiper 62A and the first rubber wiper 63A are not in contact with the cleaning liquid, i.e., when they are at the first contact position, the guide portions 644A and 648A are in contact with the liquid level L of the cleaning liquid in the cleaning liquid tank 5A. The liquid including the cleaning liquid adhering to the first foam wiper 62A, the first rubber wiper 63 and the holding member 65A can be returned into the cleaning liquid tank 5A by the guide portions 644A and 648A. Therefore, the possibility that the cleaning liquid leaks from the cleaning liquid tank 5A can be reduced.

The guide portions 644A and 648A may each extend toward the bottom surface 517 of the cleaning liquid tank 5A between the first foam wiper 62A and the first rubber wiper 63A and the support surfaces 581A and 582A in a state that the first foam wiper 62A and the first rubber wiper 63A are not in contact with the cleaning liquid in the cleaning liquid tank 5A. Since the guide portions 644A and 648A extend toward the bottom surface 517 of the cleaning liquid tank 5A, it is easy to return the cleaning liquid into the cleaning liquid tank 5A via the guide portions 644A and 648A. Therefore, the possibility that the cleaning liquid leaks from the cleaning liquid tank 5A can be reduced.

Since the shielding member 7 is provided above the holding member 65A, it is possible to shield and protect the first motor 611A and the second motor 611B from the liquid scattered due to the wiping on the nozzle surfaces 58C and 58D by the wipers 62A, 62B, 63A and 63B and the mist of ink ejected from the head 3.

The opening portion 71A of the shielding member 7 is provided at an upper part of the first wipe mechanism 6A, and is opened with a size that does not interfere with the moving locus when the first wipe mechanism 6A rotates and moves between the contact position and the non-contact position. In addition, the opening portion 71B is provided at an upper part of the second wipe mechanism 6B, and is opened with a size that does not interfere with the moving locus when the second wipe mechanism 6B rotates and moves between the contact position and the non-contact position. Therefore, since the opening portion 71A does not interfere with the moving locus of the first wipe mechanism 6A, the first wipe mechanism 6A can wipe the nozzle surface 58C via the opening portion 71A. The same applies to the opening portion 71B.

As shown in FIG. 9, the shielding member 7 has the convex portions 712 and 713 protruding downward and provided at least at portions of the opening edge portion 711 forming the opening portion 71A. The liquid adhering to the shielding member 7 falls downward via the convex portions. Therefore, a possibility that the cleaning liquid will be transferred along the shielding member 7 and leaks from the cleaning liquid tank 5A can be reduced.

The convex portions 712 and 713 are provided at portions where are inside the cleaning liquid tank 5A and inner than the side surfaces 515 and 516 of the cleaning liquid tank 5A. Therefore, the liquid adhering to the shielding member 7 falls into the cleaning liquid tank 5A inner than the side surfaces 515 and 516 via the convex portions 712 and 713. Therefore, the possibility that the cleaning liquid leaks from the cleaning liquid tank 5A can be reduced.

In addition, the convex portions 712 and 713 have the lowest points 712A and 713A, respectively, at points other than above the holding member 65A. Therefore, the liquid adhering to the shielding member 7 falls to points other than the holding member 65A via the lowest points 712A and 713A of the convex portions 712 and 713. Therefore, a possibility that the liquid transferred along the convex portions 712 and 713 will fall onto the holding member is reduced.

MODIFIED EMBODIMENTS

The present disclosure is not limited to the above embodiment, and can be variously changed. The printing apparatus 1 may be configured to move the cleaning assembly 5 relative to the carriage 30 in the main scanning direction by moving the cleaning assembly 5 relative to the fixed carriage 30 in the main scanning direction.

The support surface reinforcing members 581B to 584B are not limited to those extending from the first bottom walls 51B and 52B, and may extend from the first peripheral walls 51F, 51S, 52F, 52S and the like.

The printing apparatus 1 may switch the wiper 60 between the contact position and the non-contact position by linearly moving the wiper 60 in the upper and lower direction. In this case, a cam mechanism, a rack and pinion, an air cylinder, or the like may be used as a power unit for moving the wiper 60. The wipe mechanism 6 may be provided directly on the frame body 20 of the printing apparatus 1. In this case, the wiper 60 of the wipe mechanism 6 may not be cleaned by the cleaning liquid.

The wiper 60 may have only one of the foam wiper and the rubber wiper, and may not have the other. As for each of the first wiper 60A and the second wiper 60B, a plurality of foam wipers and rubber wipers may be aligned in the main scanning direction, respectively. Instead of the foam wiper, a wiper made of another material having a water-absorbing property may be used. Instead of the rubber wiper, a wiper made of another material having elasticity may be used. The rubber wiper may be provided between the foam wiper and the cap mechanism 40 in the main scanning direction. That is, the positions of the rubber wiper and the foam wiper in the main scanning direction may be interchanged. In addition, the cleaning member is not limited to the wiper 60, and may be a cloth or the like that wipes the nozzle surfaces 58C and 58D. The cleaning liquid tank 5A may be provided separately from the flushing box 5B.

The surfaces as the liquid leakage suppression member are provided in a pair in the front and rear direction for each of the holding members 65A and 65B, but a plurality of support surfaces may be provided in the front and rear direction, respectively. The first communication portions 541 and 542 are provided as outlets of the cleaning liquid tank 5A, but the number is not limited to two, and may be one or three or more. Further, although the support surface reinforcing members 581B to 584B are provided in pairs in front of and behind each of the support members 581 to 584, they may be provided only on one side of the front and rear sides. Further, the guide portions 644A and 648A are provided in a pair for the holding member 65A, but the number is not limited to the pair, and a guide portion may be further provided between the guide portions 644A and 648A.

What is claimed is:

1. A printing apparatus comprising:
- an inkjet head having a nozzle surface on which a nozzle for ejecting ink is formed;
- a cleaning liquid tank configured to store a cleaning liquid;
- a cleaning member provided inside the cleaning liquid tank and configured to wipe the nozzle surface;
- a holding member extending from an outside of the cleaning liquid tank into the cleaning liquid tank and configured to hold the cleaning member;
- a drive device configured to drive the holding member; and
- a liquid leakage suppression member provided to the cleaning liquid tank, the holding member, or both of the cleaning liquid tank and the holding member, and configured to suppress the cleaning liquid from leaking from the cleaning liquid tank, wherein the liquid leakage suppression member has a support surface provided inside the cleaning liquid tank and configured to support the holding member.

2. The printing apparatus according to claim 1, wherein the cleaning liquid tank has an outlet for discharging the cleaning liquid, and the support surface is provided at a position higher than a lower portion of the outlet.

3. The printing apparatus according to claim 2, wherein the cleaning liquid tank has:
- a side surface;
- a bottom surface; and
- a support surface reinforcing member extending from the side surface or the bottom surface, and the support surface is connected to the support surface reinforcing member.

4. The printing apparatus according to claim 3, wherein the cleaning liquid tank has an outlet for discharging the cleaning liquid, and the support surface reinforcing member is provided at a position lower than a lower portion of the outlet.

5. The printing apparatus according to claim 1, wherein the cleaning liquid tank has:
- a side surface;
- a bottom surface; and
- a support surface reinforcing member extending from the side surface or the bottom surface, and the support surface is connected to the support surface reinforcing member.

6. The printing apparatus according to claim 5, wherein the cleaning liquid tank has an outlet for discharging the cleaning liquid, and the support surface reinforcing member is provided at a position lower than a lower portion of the outlet.

7. The printing apparatus according to claim 1, wherein between the support surface and a side surface of the cleaning liquid tank, the support surface is configured to support a lowest side of the holding member extending from the outside of the cleaning liquid tank into the cleaning liquid tank.

8. The printing apparatus according to claim 1, wherein the holding member has a guide portion configured to come into contact with the cleaning liquid in the cleaning liquid tank, in a state that the cleaning member is not in contact with the cleaning liquid in the cleaning liquid tank.

9. The printing apparatus according to claim 8, wherein the guide portion extends toward a bottom surface of the cleaning liquid tank between the cleaning member and the support surface, in a state that the cleaning member is not in contact with the cleaning liquid in the cleaning liquid tank.

10. The printing apparatus according to claim 1, further comprising:
- a shielding member provided above the holding member and configured to shield the drive device from a liquid scattered due to wiping on the nozzle surface by the cleaning member and a mist of the ink ejected from the inkjet head.

11. The printing apparatus according to claim 10, wherein the shielding member has an opening portion having a size that does not interfere with a moving locus of the cleaning member.

12. The printing apparatus according to claim 11, wherein the shielding member has a convex portion protruding downward and provided at least at a portion of an opening edge portion forming the opening portion.

13. The printing apparatus according to claim 12, wherein the cleaning liquid tank has a side surface, and the convex portion is provided at a portion where is inside the cleaning liquid tank and inner than the side surface.

14. The printing apparatus according to claim 12, wherein the convex portion has a lowest point at a point other than above the holding member.

15. A cleaning assembly of a printing apparatus, the cleaning assembly comprising:
- a cleaning liquid tank configured to store a cleaning liquid;
- a cleaning member provided inside the cleaning liquid tank and configured to wipe a nozzle surface of an inkjet head;
- a holding member extending from an outside of the cleaning liquid tank into the cleaning liquid tank and configured to hold the cleaning member;
- a drive device configured to drive the holding member; and
- a support surface provided inside the cleaning liquid tank and configured to support the holding member.

16. A cleaning assembly of a printing apparatus, the cleaning assembly comprising:
- a cleaning liquid tank configured to store a cleaning liquid;
- a cleaning member provided inside the cleaning liquid tank and configured to wipe a nozzle surface of an inkjet head;
- a holding member extending from an outside of the cleaning liquid tank into the cleaning liquid tank and configured to hold the cleaning member;
- a drive device configured to drive the holding member; and
- a support surface provided inside the cleaning liquid tank and configured to support the holding member, wherein the holding member has a guide portion configured to come into contact with the cleaning liquid in the cleaning liquid tank, in a state that the cleaning member is not in contact with the cleaning liquid in the cleaning liquid tank.

17. A cleaning assembly of a printing apparatus, the cleaning assembly comprising:

a cleaning liquid tank configured to store a cleaning liquid;

a cleaning member provided inside the cleaning liquid tank and configured to wipe a nozzle surface of an inkjet head;

a holding member extending from an outside of the cleaning liquid tank into the cleaning liquid tank and configured to hold the cleaning member;

a drive device configured to drive the holding member;

a support surface provided inside the cleaning liquid tank and configured to support the holding member; and a shielding member provided above the holding member and configured to shield the drive device from a liquid scattered due to wiping on the nozzle surface by the cleaning member and a mist of the ink ejected from the inkjet head.

* * * * *